United States Patent [19]

Durand, deceased

[11] Patent Number: 4,699,576
[45] Date of Patent: Oct. 13, 1987

[54] POSITIVE DISPLACEMENT DEVICE

[75] Inventor: Joseph L. Durand, deceased, late of Tacoma, Wash., by Giuliana G. Durand, heiress

[73] Assignees: John E. Durand; Loreta Durand; Robert L. Sassone, all of El Toro, Calif.

[21] Appl. No.: 576,743

[22] Filed: Feb. 3, 1984

[51] Int. Cl.⁴ ............................ F01C 1/02; G01F 3/08
[52] U.S. Cl. ........................................ 418/58; 73/256; 417/353
[58] Field of Search ................................ 418/58, 208; 73/255–258; 417/353

[56] References Cited

U.S. PATENT DOCUMENTS

| | | | |
|---|---|---|---|
| 21,632 | 9/1858 | Trimmer | 418/208 |
| 96,262 | 10/1869 | Pilliner et al. | 418/58 |
| 353,699 | 12/1886 | Nash | 73/256 |
| 353,806 | 12/1886 | Nash | 73/256 |
| 720,542 | 2/1903 | Wharton | 418/58 X |
| 849,099 | 4/1907 | Batdorf | 418/208 |
| 1,041,606 | 10/1912 | Dembowsky | 418/58 |
| 1,312,838 | 8/1919 | Dembowsky | 418/58 |
| 2,103,474 | 12/1937 | Lindberg | 418/58 |
| 2,898,034 | 8/1959 | Rochlus | 418/58 |

Primary Examiner—John J. Vrablik
Assistant Examiner—Ted Olds
Attorney, Agent, or Firm—Robert L. Sassone

[57] ABSTRACT

A positive displacement device capable of performing the typical positive displacement device functions such as pump, generator, flow meter, etc. is presented. The device comprises a housing having interior surfaces defining an inlet and an outlet separated by two generally circular cylindrical fluid flow chambers. A fulcrum is near the center of the device. A positive displacement barrier separates the inlet from the outlet. The barrier which is the only moving part comprises two circular cylindrical pistons coupled by a generally planar plenum barrier. The plenum barrier slides back and forth and teeter totters on a fulcrum so that each piston is always sealing the inlet from the outlet along the inside of its associated cylinder while each piston orbits its cylinder in a different direction. Fluid is caused to move around the piston by the piston and its sealing point.

6 Claims, 12 Drawing Figures

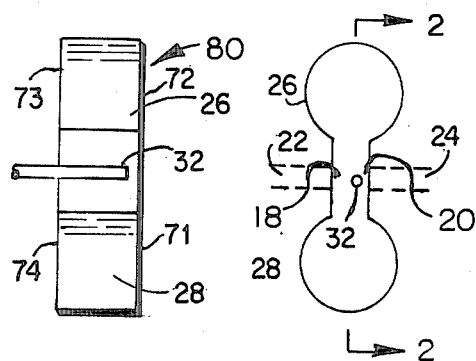
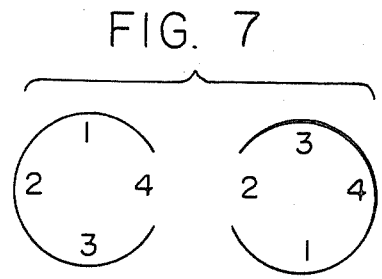
FIG. 7
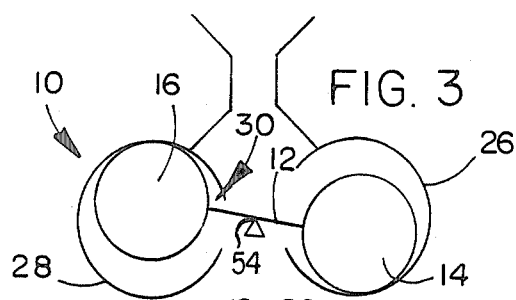
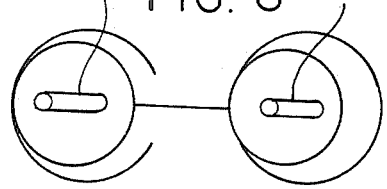
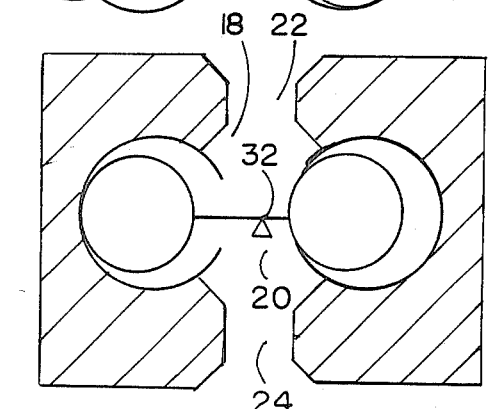
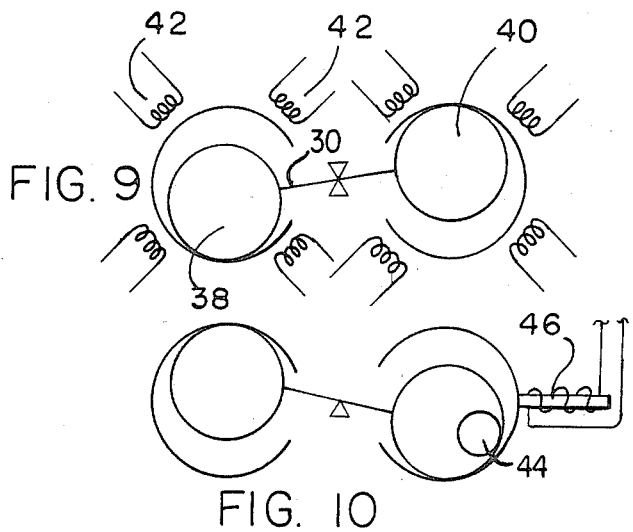
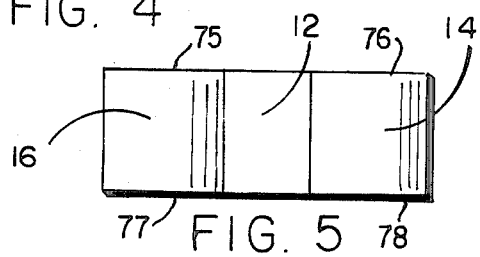
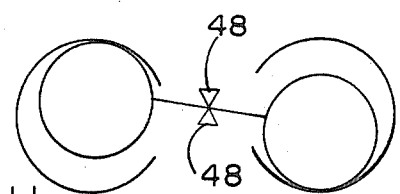
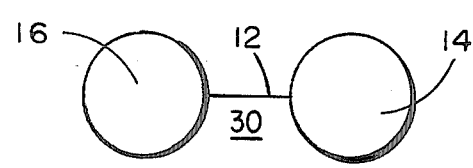
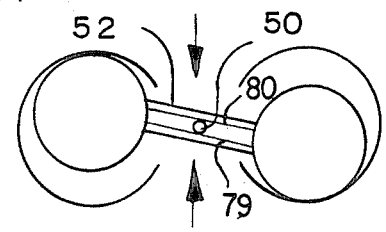

POSITIVE DISPLACEMENT DEVICE

BACKGROUND OF THE INVENTION

1. Field of the Invention

The present invention relates to two cylinder positive displacement devices used for pumping and similar uses which have only one moving part and which substantially always seal the inlet from the outlet to prevent backflow.

2. Description of the Prior Art

The prior art includes thousands of positive displacement devices which have been granted patents. There are probably many more thousands which have not been granted patents. They can be used for pumping, motors, generators, flow meters, and other uses. They can be used to convert something else into mechanical energy such as the movement of a car or fluid or they can convert mechanical energey into something else such as a different mechanical energy or electricity or the movement of a fluid.

Two days were spent in the patent office looking at all the patents and all the classes and subclasses that were suggested by all of the examiners to whom the applicant's attorney was touted as being possible experts in the particular area covered by the present application. No patent found disclosed anything very close to the present concept. The rotary engines and the positive displacement devices based on similar concepts were probably the closest.

SUMMARY OF THE INVENTION

A positive displacement device is presented which may be utilized as a flowmeter, pump, motor, generator, or any of the other prior art typical uses of positive displacement devices. The device comprises a housing having interior surfaces defining an inlet port, an inlet plenum, a pair of generally circular cylindrical fluid flow chambers, at least one fulcrum, an outlet plenum and an outlet port. The inlet port is coupled to the inlet plenum which is coupled to the pair of generally circular cylindrical fluid flow chambers which are coupled to the outlet plenum which is coupled to the outlet port.

Each fulcrum, no greater than two in number, has a bearing surface near the center of the volume defined by the housing.

By way of limitation, the positive displacement device has only one moving part which is a positive displacement inlet/outlet barrier disposed inside the housing between the inlet plenum and the outlet plenum. No other moving part is required for an example of the present invention. The inlet/outlet barrier is disposed inside the housing between the inlet plenum and the outlet plenum and comprises a generally planar plenum barrier slidably coupled to each fulcrum bearing surface. The generally planar plenum barrier is fixedly coupled on each of two opposite ends to generally circular cylindrical pistons. Each piston is disposed within, parallel to, incrementally shorter in length than and slightly smaller in diameter than the cylindrical fluid flow chamber in which it is coupled and around the interior surface of which the piston orbits. The barrier is slidably coupled to each fulcrum bearing surface and nutates in a sliding teeter totter coupling such that when fluid flows from the inlet port to the outlet port, one piston orbits the cylinder in which it is coupled in a clockwise direction and the other piston orbits the chamber in which it is coupled in a counter-clockwise direction. The planar plenum barrier slides back and forth along the fulcrum bearing surface a distance about equal to the difference in diameter between the pistons and the chambers in which they are coupled. The difference in diameter between one chamber and its piston equals the difference in diameter between the other chamber and its piston, Each piston is incrementally less in heighth than the chamber in which it is coupled so as to form a seal between the top planar surface of each piston and the associated interior surface of the chamber and between the bottom planar surface of each piston and the associated planar surface of the chamber in which it is coupled.

The inlet plenum has complementary variable geometry during operation. The pair of generally circular cylindrical fluid flow chambers are disposed along parallel axes which are also parallel to the linear bearing surface of the fulcrum which bearing surface is (or if there are two fulcrums, are) near the center of the volume between the pair of generally circular cylindrical fluid flow chambers or half-way between the axes of the pair of generally circular cylindrical fluid flow chambers. If there is only one fulcrum, the inlet/outlet barrier is slidably coupled to the one fulcrum bearing surface. If there are two fulcrums, the planar plenum barrier is slidably coupled to only one of the fulcrum bearing surfaces during operation. Each piston is disposed about an axis which during operation is parallel to and orbits the axis of the generally circular cylindrical fluid flow chamber in which the piston is coupled and around the interior circumferential surface of which the piston orbits.

Each chamber has a generally planar top and bottom interior surface perpendicular generally to the chamber axis. Each piston has a generally planar top and bottom exterior surface generally perpendicular to the piston axis and coupled to the adjacent interior surface of the chamber. The difference in diameter between one chamber and its coupled piston equals the difference in diameter between the other chamber and its piston, each piston being incrementally less in height than the chamber in which it is coupled so as to form a seal between the top planar surface of each piston and the coupled top planar interior surface of the chamber and between the coupled bottom planar surface of each piston and the associated planar surface of the chamber in which it is coupled.

In operation, each chamber is always receiving and discharging fluid except for one incremental time per cycle when the piston for a very short period of time cuts off the inlet and outlet of the chamber.

Initially, if the device is to be used as a flow meter or some other use wherein fluid flow causes the pistons to nutate, one of the pistons is almost certain to be farther from the fulcrum than the other. Fluid flow will then cause that piston to move toward the outlet slightly until the pistons begin nutating. If the pistons are exactly equal in distance from the fulcrum, and otherwise placed so that the fluid flow has a tendency to act equally on each piston, eddy currents in the fluid will cause one piston or the other to move towards the outlet while the opposing piston is forced toward the inlet thus establishing the nutation. There is substantially no backflow, except for incremental time, each chamber is always discharging and receiving fluid and the fluid flow establishes a pattern around each piston in a manner slightly similar to that of the fluid flow around the circumference of a rotary pump. The present invention has an advantage over centrifugal pumps and similar devices in that it is positive displacement.

In another example of the invention there are two fulcrums having linear bearing surfaces parallel and disposed apart a distance slightly greater than the thickness of the planar plenum barrier. The planar plenum barrier is of uniform thickness and is disposed between the two fulcrums. The device is capable of fluid flow selectively in either direction, and the planar plenum barrier during operation is coupled to the closest outlet plenum.

In another example, the fulcrum comprises a cylinder fixedly coupled to the interior surface of the housing and the planar plenum barrier has two generally planar parallel interior surfaces disposed apart a distance slightly greater than the diameter of the fulcrum. One of the surfaces is disposed on each side of the fulcrum. The planar plenum barrier is slidably coupled to the fulcrum by the surface.

In another example, one of the pistons has a surface which is a conductor or magnet and is coupled to an electrically activated pick-up coil wherein the current from the coil can be utilized to count the number of times the conductor or magnet passes the coil.

In still another example, the positive displacement inlet/outlet barrier is magnetic with one of the pistons presenting at least one north magnetic pole and the opposing piston presenting at least one south magnetic pole. Electrically activatable coils are each coupled to a current source and are magnetically coupled to each pole wherein the coil can drive or be driven by nutation of the pistons. In an example of this particular example, four coils are disposed around each chamber, each coil being disposed ninety degrees from the adjacent coil.

In still another example of the invention there is only one fulcrum linear bearing surface which couples to only one planar plenum barrier surface and wherein the device permits fluid flow in only one direction.

In still another example of the invention, one or both pistons is coupled to crank means and the device can be utilized to convert fluid flow energy to rotary crank rotating energy which is called cranked energy or alternatively can utilize cranked energy in a pumping arrangement to generate fluid flow energy by pumping a fluid. To be bidirectional, such as invention would require a two fulcrum set up or a two planar barrier surface set up as described elsewhere.

Most liquids, when passing through a positive displacement device leave a deposit. In the present device, such a deposit will be worn off by friction between the pistons and chambers causing the pistons and chambers to retain the deposit where friction is less with a consequent improvement in sealing between the pistons and chambers. A displacement device according to the present invention could be made into either a pump or a generator. If it were to be a generator, the fluid flowing through would cause the two pistons to orbit and generate an alternating current in the coils which could then be tapped off and used as alternating currents are used in the prior art. Alternatively, if it were to be used as a pump, the alternating current on the coils would cause the inlet/outlet barrier to nutate and cause the pistons to orbit thereby pumping fluid. A positive displacement device according to the present invention could be fabricated without high tolerances, because deposits from the fluid on the pistons and interiors of the chambers would collect until the surfaces were near ideal, after which the deposits would wear off by friction as fast as they were being deposited. Each piston is disposed within, parallel to, incrementally shorter in length than and slightly smaller in diameter than the cylindrical fluid flow chamber in which it is coupled and around the interior surface of which the piston orbits. The barrier is slidably coupled to each fulcrum bearing surface and nutates in a sliding teeter totter coupling such that when fluid flows from the inlet port to the outlet port, one piston orbits the cylinder in which it is coupled in a clockwise direction and the other piston orbits the chamber in which it is coupled in a counter-clockwise direction. The planar plenum barrier slides back and forth along the fulcrum bearing surface a distance about equal to the difference in diameter between the pistons and chambers in which they are coupled. The distance between one chamber and its piston equals the difference in diameter between the other chamber and its piston. Each piston is incrementally less in heighth than the chamber in which it is coupled so as to form a seal between the top planar surface of each piston and the associated interior surface of the chamber and between the bottom planar surface of each piston and the associated planar surface of the chamber in which it is coupled.

During orbiting, a moving line along the exterior circumference of each piston seals against a moving line along the adjoining interior circumference of each chamber to form an orbiting seal which prevents substantially all backflow. Fluid flow rates are a function of changes in volume in the combined two chambers on the side of the outlet plenum from the inlet/outlet barrier. Once each cycle, one hundred and eighty degrees apart, each piston closes off the entrance to its associated chamber and the maximum volume on the outlet plenum side of the piston occurs just after the piston passes the closed off point. Fluid flow is passing through each chamber from inlet to outlet at all times except once each cycle when the piston closes off the chamber from the plenum. There are no substantial forces tending to force fluid in the direction opposed to flow, so there is no substantial backflow. In point of fact, applicant has been unable to measure any backflow at all. In addition, because there are no complex surfaces to be machined and there are only two parts, one of which is moving, the present invention can be manufactured substantially cheaper than any prior art positive displacement device.

As described to this point, the device can only flow in one direction because flow in the opposing direction would move the inlet/outlet plenum barrier off the fulcrum. There are two different ways that the device could be made bidirectional. The first of these involves utilizing two fulcrums, the second involves a circular cylindrical fulcrum between two parallel planar barrier surfaces.

DRAWING DESCRIPTION

Reference should be made at this time to the following detailed description which should be read in conjunction with the following drawings, of which:

FIG. 1 is an example of part of the housing of an example of the present invention;

FIG. 2 is a side view of the housing of FIG. 1 along the line 2—2;

FIG. 3 illustrates a partially cut away side view of a part of a housing similar to that shown in FIG. 1 and further including an inlet/outlet barrier slidably coupled to a fulcrum bearing surface;

FIG. 4 illustrates a partially cut away side view of the invention of FIG. 3 with the inlet/outlet barrier nutated ninety degrees;

FIG. 5 illustrates a view of the inlet/outlet barrier previously shown in FIG. 4 rotated ninety degrees and removed from the housing;

FIG. 6 illustrates the inlet/outlet barrier of FIG. 5 rotated ninety degrees to the same essential view as shown in FIG. 4;

FIG. 7 illustrates the relative motions of the pistons of the inlet/outlet barrier with the number 1 referring to the position shown in FIG. 3, the number 2 illustrating the relative positions shown ninety degrees later in FIG. 4, the number 3 showing the relative positions ninety degrees after those shown in FIG. 4, and the number 4 showing the relative positions ninety degrees after those illustrated by the number 3 and ninety degrees before those shown in FIG. 3;

FIG. 8 illustrates an example of the invention utilizing cranks for external coupling;

FIG. 9 illustrates an example of a pump according to the present invention wherein the inlet/outlet barrier is a magnet with one piston being the north magnetic pole and the opposing piston being the south magnetic pole and a plurality of coils causing the inlet/outlet barrier to nutate as the pistons orbit, or in the alternative, substantially the same structure shown can be used as a generator, two fulcrums being illustrated to indicate that the example can be used in either direction;

FIG. 10 illustrates an example of the invention having a magnet near one end which example is used as a flowmeter which generates current pulses via an electric coil pickup adjacent thereto;

FIG. 11 illustrates an example of a postive displacement device utilizing two fulcrums which make the device capable of operating in either direction; and FIG. 12 illustrates another example of a bidirectional device utilizing one fulcrum in the center of a two planar surfaced inlet/outlet barrier.

DETAILED DESCRIPTION

Reference should be made at this time to FIG. 1-7 which illustrate various views of configurations of an example of a positive displacement device hereafter referred as a pump, 10, although it has many other possible functions typical of positive displacement devices. The pump 10 comprises a housing having interior surfaces defining the following chamber 80:

an inlet port 22 coupled to an inlet plenum 18 coupled to two generally circular cylindrical fluid flow chambers 26, 28 also referred to as cylinders 26, 28 which chambers 26, 28 are coupled to an output plenum 20 which is coupled to an outlet port 24. The pump 10 includes at least one fulcrum 32, each including a positive displacement barrier bearing surface 54.

The pump 10 includes only one moving part, comprising a positive displacement inlet/outlet barrier 30 which separates the inlet plenum 18 from the outlet plenum 20. The barrier 30 is slidably coupled to a fulcrum 32 positive displacement barrier bearing surface 54. Barrier 30 comprises a generally planar plenum barrier 12 coupled on each of two opposite ends to a generally circular cylindrical piston 14, 16. Each piston is parallel to, disposed in, incrementally shorter in length than and slightly smaller in diameter than the cylindrical fluid flow chamber 26, 28 in which it is disposed and around the surface of which it orbits. The ratio of the diameter of each piston 16, 14, to it s associated chamber 26, 28, is approximately 4 to 5 in a first example of the invention. The differnece in height between each piston 16, 14 and its associated chamber 26, 28 is incremental so that each piston 14, 16 can slide inside it s associated chamber 26, 28, and yet seal against the adjacent top or bottom surface of the chamber 26, 28 to prevent substantial leakage of fluid between the top and bottom surfaces of the piston 14, 16 and the chambers 26, 28.

The planar plenum barrier 12 is slidably coupled to the bearing surface 54 of the at least one fulcrum 32 in a teeter totter coupling such that when fluid flows from the inlet port 22 to the outlet port 24, the planar plenum barrier 12 and of course the pistons 14, 16 coupled thereto slide back and forth along the fulcrum 32 bearing surface 54 a distance about equal to the difference in diameter of each cylinder and it s associated piston. At the same time, each piston 14, 16 orbits the interior of it s associated cylinder chamber 26, 28, one piston orbiting clockwise and the other piston orbiting counter clockwise. The pistons 14, 16 orbit close enough to the adjacent interior circumference of their associated chambers 26, 28 to form orbiting seals which prevent substantially all fluid back flow.

In operation, the invention 10 works as follows. Either fluid can drive the pistons 14, 16 or vice versa. Let us assume that the invention 10 is to be used as a flowmeter. Reference should first be made to FIG. 3. Fluid comes in the inlet port 22 and enters the plenum 18. If the pistons 14, 16 are equally balanced, they might be as shown in FIG. 4, except that they would not be to the extreme left. Either one piston is more susceptible to being moved than the other, or fluid turbulence will cause one piston 14, 16 to be moved towards the outlet. This sets up a sliding back and forth and teeter totter movement of the entire inlet outlet barrier 30 which is defined as nutating or nutation with the planar plenum barrier 12 sliding and teeter tottering or nutating on the bearing surface 54 of fulcrum 32. The pistons next move to the left in FIG. 3 because FIG. 3 has been drawn with the assumption that the piston 16 is orbiting counter clockwise. In practically all examples of the invention, the pump 10 is symmetrical about an axis midway between and perpendicular to the axes of the chambers 26,28 and each piston 14, 16 and cylindrical chamber 26, 28 are identical with their opposing member on the opposite side of the fulcrum 32. The fluid moves to the left forcing the piston 16 to orbit to the position shown in FIG. 4. This simultaneously forces fluid out of the bottom portion of the chamber 28 through the outlet plenum 20 and outlet port 24. The volume at the bottom of the chamber 28 is shown as being substantially smaller in FIG. 4 (FIG. 7 orientation 2) than it is in FIG. 3 (FIG. 7 orientation 1). As more fluid flows into the inlet port 22 the orbiting pistons orbit further to the position shown in FIG. 7 orientation 3. As the left piston 16 goes down the right piston 14 goes up and vice versa. As the left piston 16 goes to the left or right, the right piston 14 also goes to the left or right. Accordingly, the motion of the pistons 14, 16 comprises orbiting their chambers 26, 28 in opposite directions, one clockwise, one counter clockwise. The position of the pistons 14, 16 ninety degrees after the shown in FIG. 7 orientation 3 is illustrated in FIG. 7 orientation 4 and the position ninety degrees later is once again illustrated in FIG. 3 and FIG. 7 orientation 1. In the present example, the openings between the inlet and outlet plena 18, 20 and the chambers 26, 28 comprise an arc equal in length to the radius of the pistons. In the same example, the radius of each chamber is about 1.25 times the radius of the associated piston. Various modifications of the dimensions illustrated on the Figures are possible within the scope of the present invention.

During operation, the planar plenum barrier 12 slides back and forth along the fulcrum bearing surface 54 a distance about equal to the difference in diameter between the pistons and the chambers in which they are coupled. Each chamber 26,28 has a generally planar top and bottom interior surface 71,72,73,74 best illustrated in FIG. 2 perpendicular generally to the chamber axis. Each piston 14,16 has a generally planar top and bottom exterior surface 75,76,77,78, best shown in FIG. 5 perpendicular to the piston axis and coupled to the adjacent interior surface 71,72,73,74 of the chamber. The difference in diameter between one chamber 26 and its pistons 14 equals the difference in diameter between the other chamber 28 and its piston 16. Each piston 14, 16 is incrementally less in height than the chamber 26,28 in which it is coupled so as to form a seal between the top planar surface 75,76 of each piston and the coupled top planar interior surface 71, 72 of the chamber 26,28 and between the coupled bottom planar surface 77,78 of each piston 14,16 and the associated bottom planar surface 73,74 of the chamber 26,28 in which it is coupled.

Reference should be made at this time to FIG. 11 wherein there are two fulcrums 48 having linear bearing surfaces parallel and disposed apart a distance slightly greater than the thickness of the planar plenum barrier 12 which is of uniform thickness and is disposed between the two fulcrums 48. The device is capable of fluid flow selectively in either direction and the planar plenum barrier 12 is coupled to the fulcrum 48 closest to the outlet plenum 24 during operation.

Reference should be made at this time to FIG. 12 wherein the fulcrum 50 comprises a cylinder fixedly coupled to the interior surface of the housing and the planar plenum barrier 12 has two generally planar parallel interior surfaces 79,30 disposed apart a distance slightly greater than the diameter of the fulcrum 50. One of said surfaces 79,80 is disposed on each side of the fulcrum 50 and the planar plenum barrier 12 is slidably coupled to the fulcrum by the surface 79,80 closest to the inlet port during operation. A device such as shown in FIG. 12 would be capable selectively of fluid flow in either direction.

Reference should be made at this time to FIG. 10 which illustrates a flowmeter example of the device. At least one of the pistons has a surface 44 which is a conductor or magnet and is coupled to an electrically activated pick-up coil 46 wherein the current pulse from the coil can be utilized to count the number of times the conductor 44 passes the coil 46.

Reference should be made at this time to FIG. 9 wherein the positive displacement inlet/outlet barrier 30 is magnetic with one of the pistons 38 presenting at least one north magnetic pole and the opposing piston 40 presenting at least one south magnetic pole and electrically activatable coils 42 are coupled to a current source and are magnetically coupled to each pole. The device shown in FIG. 9 could comprise a pump or a motor having only one moving part, the inlet/outlet barrier 30. The four coils 42 could be disposed around each chamber 26,28 ninety degrees from each adjacent coil 42 or could be set up in any of the other manners known to the prior art.

While FIG. 9 illustrates an example utilizing two fulcrums, which would permit fluid flow selectively in either direction, examples of the present invention could also be as illustrated in FIGS. 3 and 4 wherein there is only one fulcrum 32 having only one fulcrum linear bearing surface 32 which couples only to one planar plenum inlet/outlet barrier 30 surface and wherein the device 10 permits fluid flow in only one direction.

A particular example of the invention has been illustrated to satisfy the requirements of title 35 USC §112. Other examples have also been illustrated. Still other examples will be obvious to those skilled in the art. The invention is limited only by the following claims.

Reference should be made at this time to FIG. 8 which illustrates an example of the device wherein each piston surface is coupled to crank means so that the device is capable of converting energy from fluid flow energy to cranked energy and from cranked energy to fluid flow energy. Alternatively, with a two fulcrum arrangement, only one crank would be necessary, but the device might not operate as well. If the cranks were geared appropriately, the fulcrum could be replaced by an appropriate gear arrangement outside the chambers.

In like manner, the invention described in FIG. 9 could operate with no fulcrum if the nutation of the pistons 38,40 was controlled by the coupling to the coils 42.

What is claimed is:

1. A positive displacement device comprising a housing having interior surfaces defining an inlet port, a complementary variable geometry during operation inlet plenum, a pair of generally circular cylindrical fluid flow chambes disposed around parallel axes, no more than one fulcrum, a complementary variable geometry during operation outlet plenum and an outlet port wherein the inlet port is coupled to the inlet plenum which is coupled to the pair of generally circular cylindrical fluid flow chambers which are coupled to the outlet plenum which is coupled to the outlet port; the fulcrum, having a linear bearing surface parallel to the axes of the pair of generally circular cylindrical fluid flow chambers near the center of the volume between the pair of generally circular cylindrical fluid flow chambers; the positive displacement device has only one moving part comprising a moving barrier which is a positive displacement inlet/outlet barrier disposed inside the housing between the inlet plenum and the outlet plenum and comprising a generally planar plenum barrier slideably coupled to a fulcrum bearing surface in a teeter totter coupling during flow operation, the generally planar plenum barrier fixedly coupled on each of two opposite ends to generally circular cylindrical pistons, each piston being disposed within, parallel to, incrementally shorter in length than, smaller in diameter than and disposed around an axis which during operation is parallel to and orbits the axis of the generally circular cylindrical fluid flow chamber in which it is coupled and around the interior circumferential surface of which the piston orbits, the barrier being slideably coupled to fulcrum bearing surface during operation and nutating in a sliding teeter totter coupling such that when fluid flows from the inlet port to the outlet port, one piston orbits the chamber in which it is coupled in a clockwise direction and the other piston orbits the chamber in which it is coupled in a counter-clockwise direction and the planar plenum barrier slides back and forth along the fulcrum bearing surface a distance about equal to the difference in diameter between the pistons and the chambers in which they are coupled, each chamber has a generally planar top and bottom interior surface perpendicular generally to the chamber axis and each piston has a generally planar top and bottom exterior surface perpendicular to the piston axis and coupled to the adjacent interior surface of the chamber, the difference in diameter between one chamber and its piston equals the difference in diameter between the other chamber and its piston, each piston being incrementally less in height than the chamber in which it is coupled so as to form a seal between the top planar surface of each piston and the coupled top planar interior surface of the chamber and between the coupled bottom planar surface of each piston and the associated planar surface of the chamber in which it is coupled and wherein the device permits fluid flow in only one direction.

2. The invention of claim 1 wherein at least one of the pistons has a surface which is a conductor and is coupled to an electrically activated pickup coil wherein the current from the coil can be utilized to count the number of times the conductor passes the coil.

3. The invention of claim 1 wherein the positive displacement inlet/outlet barrier is magnetic with one of the pistons presenting at least one north magnetic pole and the opposing piston presenting at least one south magnetic pole and electrically activatable coils each coupled to a current source are magnetically coupled to each pole.

4. The invention of claim 3 wherein four coils are disposed around each chamber, each coil being disposed ninety degrees from the adjacent coil.

5. The invention of claim 1 wherein each piston surface is coupled to crank means so that the device is capable of converting energy from fluid flow energy to cranked energy and from cranked energy to fluid flow energy.

6. A positive displacement device comprising a housing having interior surfaces defining an inlet port, a complementary variable geometry during operation inlet plenum, a pair of generally circular cylindrical fluid flow chambers disposed around parallel axes, a complementary variable geometry during operation outlet plenum and an outlet port wherein the inlet port is coupled to the inlet plenum which is coupled to the pair of generally circular cylindrical fluid flow chambers which are coupled to the outlet plenum which is coupled to the outlet port; the positive displacement device has only one moving part comprising a moving barrier which is a positive displacement inlet/outlet barrier disposed inside the housing between the inlet plenum and the outlet plenum and comprising a generally planar plenum barrier, the generally planar plenum barrier fixedly coupled on each of two opposite ends to generally circular cylindrical pistons, each piston being disposed within, parallel to, incrementally shorter in length than, slightly smaller in diameter than and disposed around an axis which during operation is parallel to and orbits the axis of the generally circular cylindrical fluid flow chamber in which it is coupled and around the interior circumferential surface of which the piston orbits, the barrier being slidably coupled to a fulcrum bearing surface, the barrier during operation nutating under the control of external electrical forces transmitted to the pistons from coils disposed outside the chambers through the chamber walls to control the pistons which are respectively north and south magnetic poles, with no more than one fulcrum, one piston orbits the chamber in which it is coupled in a clockwise direction and the other piston orbits the chamber in which it is coupled in a counter-clockwise direction, each chamber has a generally planar top and bottom interior surface perpendicular generally to the chamber axis and each piston has a generally planar top and bottom exterior surface perpendicular to the piston axis and coupled to the adjacent interior surface of the chamber, the difference in diameter between one chamber and its piston equals the difference in diameter between the other chamber and its piston, each piston being incrementally less in height than the chamber in which it is coupled so as to form a seal between the top planar surface of each piston and the coupled top planar interior surface of the chamber and between the coupled bottom planar surface of each piston and the associated planar surface of the chamber in which it is coupled.

* * * * *